UNITED STATES PATENT OFFICE.

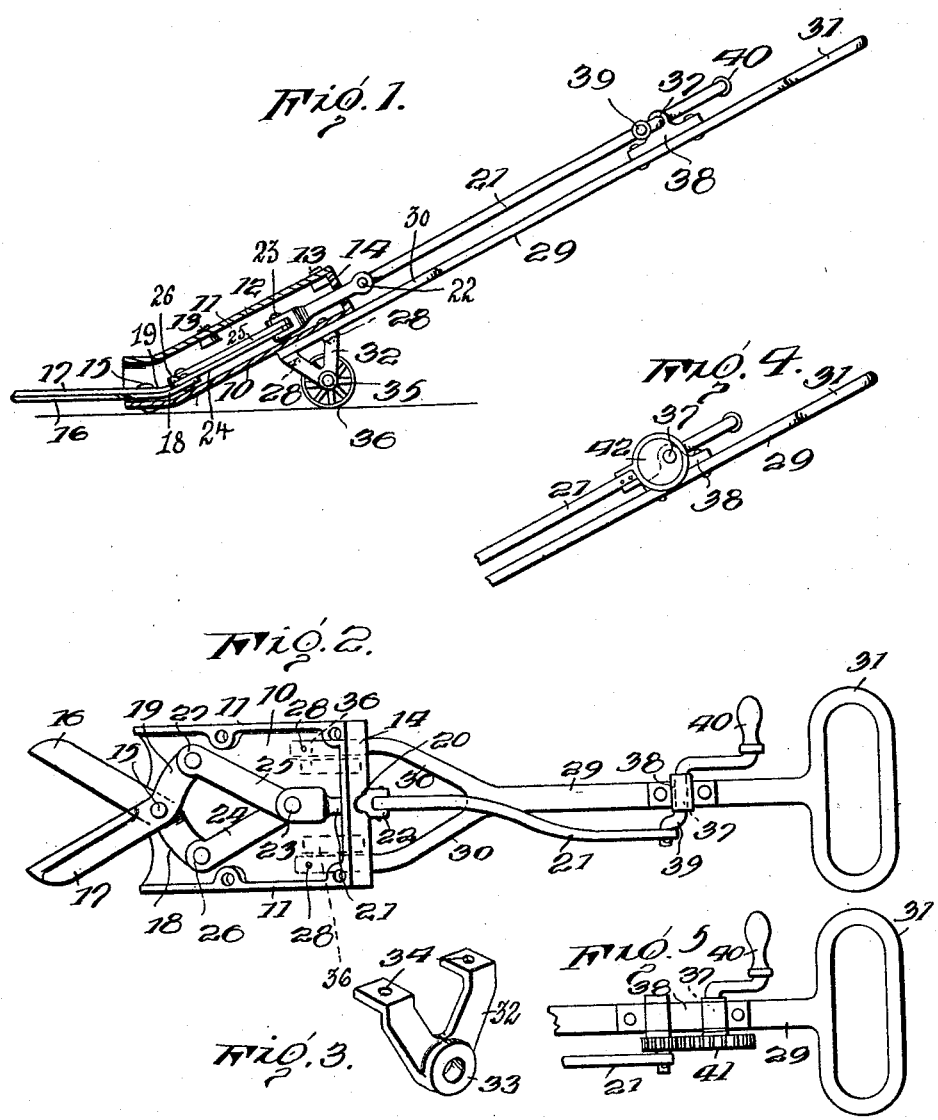

WILBUR A. WALTERS AND JOHN W. JONES, OF EAST LIVERPOOL, OHIO.

LAWN-TRIMMER.

1,199,134.

Specification of Letters Patent. Patented Sept. 26, 1916.

Application filed April 12, 1916. Serial No. 90,772.

*To all whom it may concern:*

Be it known that we, WILBUR A. WALTERS and JOHN W. JONES, citizens of the United States, residing at East Liverpool, in the county of Columbiana and State of Ohio, have invented certain new and useful Improvements in Lawn-Trimmers, of which the following is a specification.

This invention relates to improvements in lawn trimmers or garden shears, and has for one of its objects to improve the construction and increase the efficiency and utility of devices of this character.

Another object of the invention is to provide a device of this character wherein provision is made for protecting and guarding the operating mechanism during the operation of the device.

With these and other objects in view, the invention consists in certain novel features of construction, as hereinafter shown and described and then specifically pointed out in the claims; and in the drawings illustrative of the preferred embodiment of the invention Figure 1 is a side elevation, partly in section, of the improved device; Fig. 2 is a plan view of the parts shown in Fig. 1 with the covering of the housing portion detached: Fig. 3 is an enlarged perspective view of one of the wheel supporting brackets; Fig. 4 is a side view of a modified arrangement of the driving mechanism. Fig. 5 is a plan view of another modified arrangement of the driving mechanism.

Corresponding and like parts are referred to in the following description and indicated in all the views of the drawings by the same reference characters.

The improved device comprises a combined housing and support for the operating mechanism and comprising a base or floor portion 10, vertical sides 11 and a detachable cover or top 12, the top being secured in position by any suitable means, for instance by clamp bolts 13. The housing is open at the front and closed at the rear, as shown at 14, with the forward portion extending in parallel relation to the ground and the rear portion inclined upwardly and rearwardly, as shown in Fig. 1. The housing will preferably be constructed of metal as thin and light as possible consistent with the strains to which it will be subjected when in use.

Pivoted at 15 to the base portion 10 of the housing near its open end are cutting shears comprising forwardly directed blades 16—17 and rearwardly directed arms 18—19. The rear 14 of the housing is perforated, as shown at 20, and movable through the opening is an operating rod 21, the rod preferably having a joint 22 rearwardly of the housing. Pivoted at 23 to the forward end of the rod 21 and within the housing are connecting bars 24—25, the rod 24 being pivoted at 26 to the arm 18 and the rod 25 being pivoted at 27 to the arm 19. By this means it will be obvious that when the rod 21 is moved longitudinally of the housing the blades 16—17 will be actuated in the ordinary manner of a pair of shears.

Rigidly secured to the bottom 10 of the housing as by rivets 28 is a handle member comprising a main stock 29 and forked portions 30, the latter extending beneath the housing in position to receive the rivets 28. At its outer end the handle 29 terminates in a grip device 31.

Bearing beneath the housing are hanger devices 32 having bearings 33 at one end and lateral offsets 34 at their other ends, the offsets being arranged in position to receive the same rivets 28 whereby the handle device is secured to the housing. By this means one set of rivets is sufficient to hold the handle member and the brackets to the housing. An axle 35 extends through the bearings 33 and is provided with bearing wheels or rollers 36. By this means the housing is supported and adapted to be readily moved over the ground and likewise moved from place to place when not in use or when being transported.

Means are provided for actuating the rod 21, and for the purpose of illustration one of such operating means is illustrated in Figs. 1 and 2 and comprises a shaft 37 mounted for rotation in a suitable bearing 38 on the handle 29 and provided with a crank 39 at one end to receive the outer end of the rod 21 and with an operating crank 40 at the other end convenient to the operator to enable him to grasp the hand grip 31 with one hand and actuate the crank with the other. By this means the necessary motion may be imparted to the shear blades 16—17 as the device is moved over the ground.

A gearing mechanism 41 may be substituted for the crank shaft shown in Figs. 1 and 2, as illustrated in Fig. 5, or an eccentric mechanism 42 may be employed, as illustrated in Fig. 4.

It will be noted that the housing or casing effectually protects and guards the operating mechanism and prevents injury to the latter from outside influence, while at the same time the mechanism is readily accessible for repairs or renewal of broken parts by simply removing the closure 12.

The improved device is simple in construction, can be inexpensively and strongly constructed, and may be employed for cutting grass upon lawns in otherwise inaccessible localities.

Having thus described the invention, what is claimed as new is:—

1. In a device of the class described, an inclosure having a bottom and vertical sides spaced apart, a cover for said inclosure and engaging said sides and spaced from the bottom, cutting blades pivotally united together and pivotally connected to the bottom of said inclosure and extending in advance of the same, a handle extending from said inclosure, and means carried by said handle for actuating said blades.

2. In a device of the class described, an inclosure having a bottom and vertical sides spaced apart, cutting blades pivotally united together and pivotally connected to the bottom of said inclosure and extending in advance of the same, a handle extending from said inclosure, brackets adapted to support an axle and carrying bearing wheels, fastening devices arranged to secure said brackets and handle to the inclosure, and means carried by said handle for actuating said blades.

In testimony whereof we affix our signatures.

WILBUR A. WALTERS. [L. S.]
JOHN W. JONES. [L. S.]

Copies of this patent may be obtained for five cents each, by addressing the "Commissioner of Patents, Washington, D. C."